United States Patent
Duan (10) Patent No.: US 8,718,677 B2
(45) Date of Patent: May 6, 2014

(54) METHOD FOR PROCESSING LOCATION INFORMATION REQUEST INITIATED BY A USER EQUIPMENT

(75) Inventor: Xiaoqin Duan, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1175 days.

(21) Appl. No.: 10/585,656

(22) PCT Filed: Jan. 10, 2005

(86) PCT No.: PCT/CN2005/000031
§ 371 (c)(1),
(2), (4) Date: Dec. 27, 2007

(87) PCT Pub. No.: WO2005/069648
PCT Pub. Date: Jul. 28, 2005

(65) Prior Publication Data
US 2008/0139218 A1    Jun. 12, 2008

(30) Foreign Application Priority Data

Jan. 8, 2004    (CN) ........................... 2004 1 0000171
Jan. 8, 2004    (CN) ........................... 2004 1 0002119
Jan. 8, 2004    (CN) ........................... 2004 1 0002133

(51) Int. Cl.
*H04W 24/00*    (2009.01)
*H04W 4/00*    (2009.01)

(52) U.S. Cl.
USPC .................. 455/456.2; 455/456.3; 455/456.5; 455/433

(58) Field of Classification Search
USPC .......................... 455/456.1–456.3, 433, 456.5
See application file for complete search history.

(56) References Cited

U.S. PATENT DOCUMENTS 5,594,947 A    1/1997    Grube et al.
7,031,722 B2 *    4/2006    Naghian .................... 455/456.1
(Continued)

FOREIGN PATENT DOCUMENTS

CN    1383690 A    12/2002
CN    1516501        7/2004
(Continued)

OTHER PUBLICATIONS

"Digital cellular telecommunications system (Phase 2+) (GSM)" ETSI Standards, European Telecommunications Standards Institute, Sophia-Antipo, FR; vol. 3-CN4, No. V320; Jun. 2001; XP014007983; ISSN: 0000-0001.
European Office Action for European Patent Application No. 05 700 405.3, dated Apr. 20, 2007.
European Office Action for European Patent Application No. 05 700 405.3, dated Oct. 19, 2007.

(Continued)

*Primary Examiner* — Qun Shen
(74) *Attorney, Agent, or Firm* — Slater & Matsil, L.L.P.

(57) ABSTRACT

The present invention discloses a method for processing location information request initiated by a User Equipment (UE), which comprises: a target UE requests a Central Network (CN) for location information; the CN obtains a location estimate of the target UE and sends the location estimate of the target UE to a Visited GMLC of the target UE. According to the present invention, when the target UE requests the network with the Location Service system for location information of the target UE, after receiving the location estimate of the target UE from the Radio Access Network, the CN provides the location estimate of the target UE to the V-GMLC at first, and the V-GMLC provides the location estimate to the target UE through the CN after processing the location request, so that the V-GMLC can obtain the processing information of the location information request initiated by the target UE, and furthermore V-GMLC can correctly charge the Mobile Original Location Request initiated by the target UE.

26 Claims, 6 Drawing Sheets

(56) References Cited

U.S. PATENT DOCUMENTS

| | | | |
|---|---|---|---|
| 7,277,711 B2* | 10/2007 | Nyu | 455/456.1 |
| 7,321,775 B2* | 1/2008 | Maanoja | 455/456.1 |
| 7,369,859 B2* | 5/2008 | Gallagher | 455/456.1 |
| 7,623,447 B1* | 11/2009 | Faccin et al. | 370/230 |
| 2002/0156646 A1 | 10/2002 | Kaiwa et al. | |
| 2003/0153332 A1 | 8/2003 | Evensen et al. | |
| 2004/0203914 A1* | 10/2004 | Kall et al. | 455/456.1 |
| 2005/0003829 A1* | 1/2005 | Lala et al. | 455/456.1 |
| 2005/0020276 A1 | 1/2005 | Maanoja et al. | |

FOREIGN PATENT DOCUMENTS

| | | |
|---|---|---|
| CN | 1518369 A | 8/2004 |
| WO | 03/034765 A1 | 4/2003 |
| WO | 03/045101 A1 | 5/2003 |
| WO | 03/045104 A1 | 5/2003 |
| WO | WO03061322 | 7/2003 |
| WO | 03/105517 A1 | 12/2003 |
| WO | WO2004066658 | 8/2004 |

OTHER PUBLICATIONS

"3rd Generation Partnership Project; Technical Specification Group Services and System Aspects; Functional stage 2 description of LCS (Release 4)"; EGPP TS 23.271 V4.10.0 (Sep. 2003); Technical Specification; 69 pages.

3rd Generation Partnership Project; Technical Specification Group Services and System Spectes; Functional stage 2 description of Location Services (LCS) (Release 6); 3GPP TS 23.271 V6.6.0 (Dec. 2003); 112 pages.

Chinese Office Action for Chinese Patent Application No. 200410002133.9, dated Apr. 27, 2007, and partial English translation thereof.

Supplementary European Search Report for European Patent Application No. 05700405.3, dated Jan. 24, 2007.

Written Opinion of the International Searching Authority for International Application No. PCT/CN2005/000031, dated Apr. 7, 2005.

International Search Report for International Patent Application No. PCT/CN2005/000031, dated Apr. 7, 2005, and English translation thereof.

* cited by examiner (Prior Art)

Figure 1

(Prior Art)

METHOD FOR PROCESSING LOCATION INFORMATION REQUEST INITIATED BY A USER EQUIPMENT

FIELD OF THE INVENTION

The present invention relates to network equipments locating technologies, and particularly to a method for processing location information request initiated by a user equipment (UE).

BACKGROUND OF THE INVENTION

A Location Service (LCS) in a mobile communication network is to obtain location information of a target UE through location technologies. Wherein, the target UE is a located equipment terminal in the mobile communication network, and the location information can be information of geographical latitude and longitude information or location information for local streets. The location information obtained by the mobile communication network can be provided for the target UE and be used for locating the target UE itself; or be provided for the communication network itself for area-based charging or operation maintenance; or be provided for other application clients, which request the location information of the target UE, such as organizations and individuals, for value-added services. Therefore, the LCS is widely applied in emergency rescues, vehicle navigations and intelligent traffic systems, work dispatches and workgroup management, mobile information inquiries, network performance enhancements and so on. In the $3^{rd}$ Generation Partnership Project (3GPP), the LCS specification together with the function modules, structures, status descriptions, and message processes for implementing the LCS is illustrated thereof.

Figure 1:
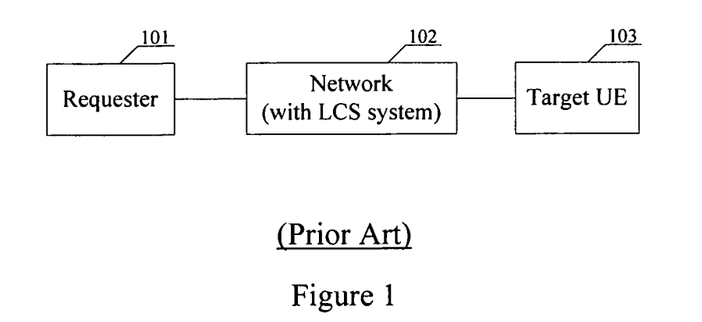
FIG. 1 is a schematic diagram illustrating a logic structure for implementing the location service.

FIG. 1 is a schematic diagram illustrating logic structure of the LCS. As shown in FIG. 1, a requester 101 requests a network 102 with the LCS system to provide location information of a target UE 103, the network 102 with the LCS system checks the validity of the requester 101 to determine whether the target UE 103 allows the requester 101 to request for its location information; if the requester 101 passes the authentication of the network 102 with the LCS system, the network 102 with the LCS system will locate the target UE 103 and then provide the requester 101 with the location information of the target UE 103; otherwise, the network 102 with the LCS system will reject the location information request toward the target UE 103 from the requester 101.

In an LCS system, function logic entities for implementing location service include: a Gateway Mobile Location Center (GMLC), a Home Location Register/Home Subscriber Server (HLR/HSS), a Central Network (CN) and a Radio Access Network (RAN). The GMLC may further include a Requesting GMLC (R-GMLC), a Home GMLC (H-GMLC) and a Visited GMLC (V-GMLC). The R-GMLC is the GMLC for receiving the location information request to the target UE initiated by the requester; the H-GMLC is the GMLC which the target UC belongs to; the V-GMLC is the GMLC in the network with the LCS system that the target UE visits, namely the GMLC that the target UE is currently located. The R-GMLC, the H-GMLC and the V-GMLC can be in a same physical entity, or be in different physical entities.

At present, 3GPP Specification defines the process of a Mobile Original Location Request (MO-LR). The generic procedure of MO-LR includes: the target UE request the LCS system for the location information of the target UE itself; the LCS system locates the target UE before sending the location estimate to the target UE; furthermore, on request of the target UE, the LCS system can provide an external requester with the location estimate of the target UE, herein the requester refers to a client that can process the location information of the target UE, such as an LCS client or an application client, rather than a literal requester that requests for the location information of the target UE.

Figure 2:
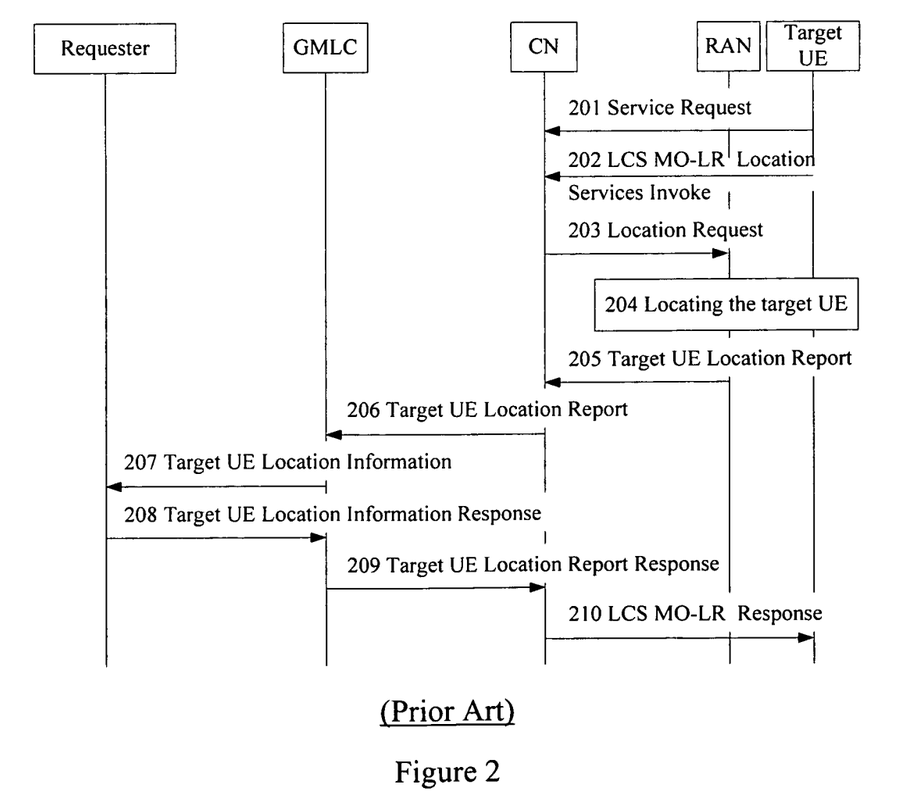
FIG. 2 is a flowchart illustrating the process of the MO-LR in the prior art.

FIG. 2 is a flowchart illustrating the process of the MO-LR in the prior art. As shown in FIG. 2, the process of the MO-LR includes:

Step 201: a target UE sends a service request to the CN through the RAN to request a wireless signaling connection with the network with the LCS system, and then the network with the LCS system may initiate a procedure of authenticating and ciphering the target UE; if the target UE passes the authentication of the network with the LCS system, the network with the LCS system continues to execute step 202; otherwise, the network with the LCS system rejects the service request for the wireless signaling connection initiated by the target UE and terminate the current process of the MO-LR.

Step 202~step 204: the target UE sends a MO-LR Location Services Invoke to the CN through the RAN and requests the CN to locate the target UE, herein the LCS MO-LR Location Services Invoke can further carry information of an external requester and request LCS system to provide the corresponding requester with the obtained location information of the target UE. After receiving the LCS MO-LR Location Services Invoke, the CN can determine whether the target UE has subscribed to the MO-LR service according to the stored information; if the target UE has not subscribed to the MO-LR service, the CN will return to the target UE an LCS MO-LR Location Services Invoke response carrying the error reason and reject the MO-LR Location Services Invoke initiated by the target UE; if the target UE has subscribed to the MO-LR service, the CN will send to the RAN a Location Request carrying an identifier of the target UE, the RAN will locate the target UE after receiving the Location Request.

Step 205: after finishing locating the target UE, the RAN returns a target UE location report to the CN, if the RAN successfully locates the target UE, i.e. obtains the location information of the target UE, the target UE location report will carry the location information of the target UE, if the target UE demands that the LCS system provides a corresponding requester with the obtained location information of the target UE, step 206 to step 210 will be further executed after the CN receives the target UE location report; otherwise, the CN directly returns an LCS MO-LR response carrying the location information of the target UE to the target UE through the RAN. If the RAN fails in obtaining the location information of the target UE, the target UE location report will carry the error reason and the CN will return a LCS MO-LR response carrying the error reason to the target UE through the RAN.

Step 206~step 207: the CN sends to a specified GMLC a target UE location report carrying a requester identifier and the location information of the target UE. After receiving the target UE location report, GMLC sends a target UE location information report carrying the location information of the target UE to the corresponding requester according to the requester identifier.

Step 208~step 209: after receiving the target UE location information report, the requester determines whether it's able to process the location information of the target UE; if the requester is able to process the location information of the target UE, the requester returns a target UE location information report response carrying a success mark to the GMLC;

otherwise, the requester returns a target UE location information report response carrying a failure mark to the GMLC. After receiving the target UE location information report response, according to the content carried in the target UE location information report response, the GMLC returns a target UE location report response that carries corresponding content to the CN. In other words, if the GMLC receives the target UE location information report response with a success mark, the GMLC will return a target UE location report response with a success mark to the CN; if the GMLC receives the target UE location information report response with the error reason, the GMLC will return a target UE location report response with the error reason to the CN.

Step 210: after receiving the target UE location report response, according to the content carried in the target UE location report response, the CN returns an LCS MO-LR response carrying the corresponding content to the target UE. In other words, if the CN receives the target UE location report response with a success mark, the CN will return an LCS MO-LR response carrying the location information to the target UE and notify the target UE that the CN has provided the requester with the location information; if the CN receives the target UE location report response with the error reason, the CN will return an LCS MO-LR response carrying the location information to the target UE, and return the error reason to the target UE to notify the target UE that the CN has provided the requester with the location information, but the corresponding requester is unable to correctly process the location information of the target UE.

It can be seen from the aforesaid process of the MO-LR Location Services Invoke defined by 3GPP specification that, when the target UE requests the network with the LCS system for the location information of the target UE, charging information is generated in the current CN of the target UE. But in practical network operation, the CN is taken as a fundamental entity for a bearer process in the network and there are a number of CNs. It is infeasible to place a specific service charging point in the CN, otherwise the process of the CN will be too much related to the service, and when the service is changed, e.g. the service is updated, the corresponding CN needs to be updated as well. Moreover, there are a large number of CN nodes in the network, if a certain service is changed, the whole network will be affected, which is not favorable to the service's development and popularization.

In addition, when the target UE requests the network with the LCS system for the location information of the target UE and demands the LCS system to provide an external requester with the location information of the target UE, the CN in the LCS system will provide the external requester with the location information of the target UE through GMLC after receiving the location information of the target UE. The aforesaid GMLC can be specified by the target UE in the LCS MO-LR Location Services Invoke, or be randomly allocated by the CN according to GMLC address information stored in the CN. In practical network operation, when the address information of the GMLC is specified by the target UE, if the current located CN of the target UE and the GMLC specified by the target UE do not belong to the same network, the current located CN of the target UE may not be able to access the GMLC; when the address information of the GMLC is allocated by the CN, herein according to the stored GMLC address information, the CN can allocate a GMLC that the CN can directly access, but the GMLC may not be able to access the specified requester, i.e. the GMLC that can directly access the requester is not the GMLC allocated by the CN. Thus, the existing MO-LR process can not provide the requester specified by the target UE with the location information of the target UE, which greatly limits the development of the MO-LR service.

SUMMARY OF THE INVENTION

In view of the above, the present invention provides a method for processing the location information request initiated by a User Equipment (UE), so that a V-GMLC of the UE can obtain processing information of the location information request initiated by the UE, and correctly charge a Mobile Original Location Request (MO-LR) Location Services Invoke initiated by the target UE; besides, in the present invention, when the UE requests an LCS system to provide a requester with the location information of the UE, the LCS system can correctly provide the specified requester with the location information of the UE.

The specific technical solution of the present invention is achieved as follows:

A method for processing location information request initiated by a User Equipment (UE), comprising:

a target UE requesting a Central Network (CN) for location information of the target UE, and the CN obtaining a location estimate of the target UE;

the CN sending the location estimate of the target UE to a Visited Gateway Mobile Location Center (V-GMLC) of the target UE.

The method, after the step of the CN sending the location estimate of the target UE to the V-GMLC of the target UE, further comprises:

the V-GMLC generating charging information of the target UE.

Wherein, the step of the target UE requesting the CN for location information of the target UE further comprises:

the target UE providing the CN with a requester identifier;

the step of the CN sending the location estimate of the target UE to the V-GMLC of the target UE further comprises:

the CN providing the V-GMLC with the requester identifier; and after the step of the CN sending the location estimate of the target UE to the V-GMLC of the target UE, further comprising:

the V-GMLC sending the location estimate of the target UE to the requester.

Wherein, the step of the V-GMLC sending the location estimate of the target UE to the requester comprises:

the V-GMLC determining whether the V-GMLC can directly access the requester according to the requester identifier, if the V-GMLC can directly access the requester according to the requester identifier, the V-GMLC directly sending the location estimate of the target UE to the requester; otherwise, according to the requester identifier, the V-GMLC finding a GMLC that can directly access the requester, and sending the location estimate of the target UE to the requester through the GMLC.

A method for processing location information request initiated by a User Equipment (UE), comprising:

a target UE requesting a Center Network (CN) for location information and providing a requester identifier, the CN obtaining the location estimate of the target UE;

the CN sending the location estimate of the target UE to a V-GMLC of the target UE;

the V-GMLC sending the location estimate of the target UE to a H-GMLC; and the H-GMLC sending the location estimate of the target UE to the requester.

The method, after the step of the CN sending the location estimate of the target UE to a V-GMLC of the target UE, further comprises:

the V-GMLC generating charging information of the target UE.

The method, after the step of the V-GMLC sending the location estimate of the target UE to a H-GMLC, further comprises;

the H-GMLC generating charging information of the target UE.

Wherein, the step of he H-GMLC sending the location estimate of the target UE to the requester comprises:

the H-GMLC determining whether the H-GMLC can directly access the requester according to the requester identifier, if the H-GMLC can directly access the requester according to the requester identifier, the H-GMLC directly sending the location estimate of the target UE to the requester; otherwise, according to the requester identifier, the H-GMLC finding a GMLC that can directly access the requester and sending the location estimate of the target UE to the requester through the GMLC.

According to the methods of the present invention, when the target UE requests the network with the LCS system for the location information of the target UE, the V-GMLC can obtain processing information of the location information request initiated by the UE. Since the V-GMLC is a service gateway of the location service and can provide correct charges for different location services, the V-GMLC can correctly charge the MO-LR Location Services Invoke initiated by the UE so that service correlation at the CN node is reduced, which is favorable to development and popularization of the location services. In addition, when the target UE requests the network with the LCS system for the location information of the target UE and requests the network with the LCS system to provide the requester with the location information of the target UE, after the CN obtains the location estimate of the target UE from the RAN, there are two alternative processes. One process is: the CN provides the location estimate of the target UE for the V-GMLC, the V-GMLC sends the location estimate of the target UE to a corresponding GMLC that can access the specified requester, and then the GMLC sends the location estimate of the target UE to the specified requester; the other process is: the CN provides the location estimate of the target UE to the H-GMLC, the H-GMLC sends the location estimate of the target UE to a corresponding GMLC that can access the specified requester, and then the GMLC sends the location estimate of the target UE to the specified requester. According to the aforesaid two processes, both the V-GMLC and the H-GMLC can correctly charge the MO-LR Location Services Invoke initiated by the UE; meanwhile, the problem of routing the MO-LR Location Services Invoke when the UE is roaming is solved, so that the LCS system can correctly provides the requester specified by the target UE with the location information of the target UE, and furthermore the requester can process the location information of the target UE so as to make the process of the UE initiating location information request and requesting to provide the requester with the location information of the target UE be performed efficiently.

DETAILED DESCRIPTION OF EMBODIMENTS

The present invention will be illustrated in detail hereinafter with reference to the accompanying drawings.

According to the embodiments of the present invention, the target UE requests the network with the LCS system for the location information of the target UE, after receiving the location estimate of the target UE from the RAN, the CN provides the location estimate of the target UE to the Visited GMLC (V-GMLC) at first, the V-GMLC provides the location estimate to the target UE through the CN after processing the location request, so that the V-GMLC can obtain the processing information of the location information request initiated by the target UE.

A processing manner proposed in the embodiments of the present invention is: when the target UE requests the network with the LCS system for the location information of the target UE and demands that LCS system provide an external requester with the location information of the target UE, The CN obtains the location estimate of the target UE from the RAN and provides the V-GMLC with the location estimate, the V-GMLC sends the location estimate of the target UE to a GMLC that can directly access the specified requester, and then the GMLC provides the specified requester with the location estimate of the target UE. After receiving the location estimate of the target UE, the V-GMLC processes the locating request and provides the target UE with the location estimate through the CN, so that the V-GMLC can obtain the processing information of the location information request initiated by the target UE.

Figure 3:
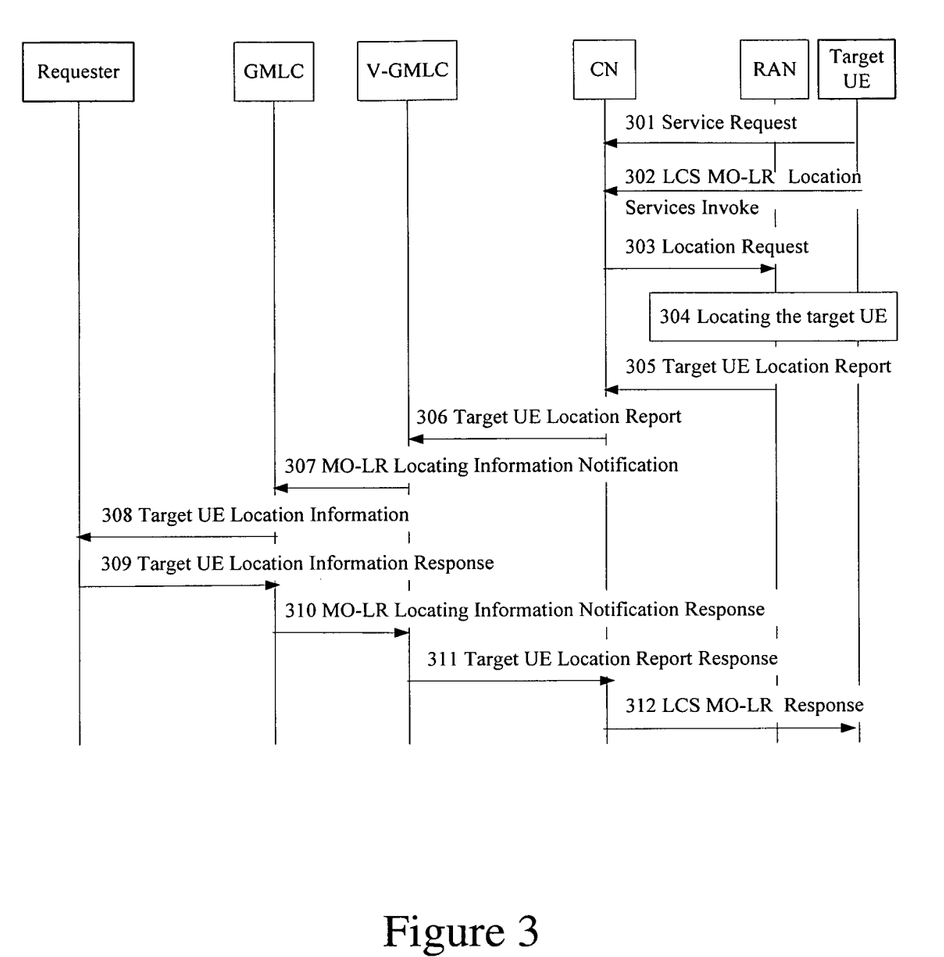
FIG. 3 is a flowchart illustrating the process of the MO-LR in accordance with the embodiments of the present invention.

FIG. 3 is a flowchart illustrating the process of MO-LR Location Services Invoke in accordance with the embodiments of the present invention. As shown in FIG. 3, the process of MO-LR Location Services Invoke includes:

Step 301: the target UE sends a service request to the CN through the RAN and requests to establish a wireless signaling connection with the network with the LCS system, herein the network with the LCS system may initiate a procedure of authenticating and ciphering the target UE, if the target UE passes the authentication of the network with the LCS system, proceeds to step 302; otherwise, the service request for the wireless signaling connection initiated by the target UE will be rejected and the current process of MO-LR Location Services Invoke will be terminated.

Step 302~step 304: the target UE sends an LCS MO-LR Location Services Invoke to the CN through the RAN and requests the CN to locate the target UE. The LCS MO-LR Location Services Invoke carries an identifier of an external requester and requests the LCS system to provide the corresponding requester with the obtained location information of the target UE; herein, the LCS MO-LR Location Services Invoke may further include an address of the GMLC that can directly access the requester specified by the target UE, so that through the GMLC the CN can provide the requester with the location estimate of the target UE. After receiving the LCS MO-LR Location Services Invoke, the CN can determine whether the target UE has subscribed to the MO-LR service according to the stored information. If the target UE has not subscribed to the MO-LR service, the CN will return an LCS MO-LR Location Services Invoke response carrying the error reason to the target UE and reject the MO-LR Location Services Invoke initiated by the target UE. If the target UE has subscribed to the MO-LR service, the CN will send a Location Request to the RAN carrying the identifier of the target UE. The RAN will locate the target UE after receiving the Location Request.

Step 305: after finishing locating the target UE, the RAN returns a target UE location report to the CN, if the RAN successfully locates the target UE to obtain the location information of the target UE, the target UE location report will carry the location information of the target UE; if the RAN fails in obtaining the location information of the target UE, the target UE location report will carry the error reason.

When the CN receives a successful target UE location report and the target UE demands that the CN provide the external requester with the location information of the target UE, the CN determines whether the MO-LR Location Services Invoke initiated by the target UE carries the address information of the GMLC that can directly access the requester. If the MO-LR Location Services Invoke initiated by the target UE carries the address information of the GMLC that can directly access the requester, the CN further determines whether the CN itself can access the GMLC; if the CN itself can access the GMLC, the CN directly sends to the GMLC the target UE location report, which carries the location information of the target UE, the requester identifier and the target UE identifier, and proceeds to step 308 without executing step 306 and step 311. If the CN cannot directly access the GMLC, the CN can acquire the address information of a V-GMLC that the CN can directly access according to the stored information or by interacting with other entities in the network, and proceeds to step 306. If the MO-LR Location Services Invoke initiated by the target UE does not carry the address information of the GMLC that can directly access requester, the CN can obtain the address information of the V-GMLC that the CN can directly access according to the stored information or by interacting with other entities in the network, and proceeds to step 306.

Step 306: the CN sends to the GMLC a target UE location report carrying the location information of the target UE, the requester identifier, the target UE identifier and GMLC control information, and then the CN notifies the V-GMLC that the target UE has initiated a MO-LR Location Services Invoke.

In order to make the V-GMLC accurately charge the request according to the processing situation of the MO-LR Location Services Invoke, after receiving the target UE location report and according to the content carried in the target UE location report, the CN can send a target UE location report that carries the corresponding content to the V-GMLC and notify the V-GMLC of the processing situation of the MO-LR Location Services Invoke initiated by the target UE. In other words, if the CN receives the target UE location report with the location information of the target UE, the CN will send a target UE location report with a success mark or the location information of the target UE to the V-GMLC; if the CN receives the target UE location report with the error reason, the CN will send a target UE location report with a failure mark to the V-GMLC, moreover, the target UE location report sent to the V-GMLC by the CN may also carry the type of the MO-LR Location Services Invoke initiated by the target UE. In addition, when the CN receives the target UE location report with the error reason, the CN can return a LCS MO-LR response with the error reason to the target UE through the GMLC and then terminate the current process of the MO-LR Location Services Invoke. Because the corresponding relation between the CN and the GMLC will be conFigured when the network is designed, the address information of the GMLC connected to the CN has already been stored in the CN in advance, and the GMLC that is connected to the currently located CN of the target UE is the V-GMLC of the target UE. When the CN sends the MO-LR Location Services Invoke to the V-GMLC to request for the location information, the CN can send a target UE location report to the GMLC, i.e. the V-GMLC of target UE, according to the GMLC address information stored in the CN.

Step 307: after receiving the target UE location report, according to the related information carried in the target UE location report, the V-GMLC generates corresponding charging information and then sends an MO-LR locating information notification to the corresponding GMLC. If the target UE location report carries GMLC address information, the V-GMLC sends to the GMLC a MO-LR locating information notification with the location information of the target UE, the requester identifier and the target UE identifier. When the target UE location report does not carry the GMLC address information, the V-GMLC obtains the address information of the requester according to the requester identifier carried in the target UE location report and determines whether the V-GMLC can directly access the requester; if the V-GMLC can directly access the requester, the V-GMLC directly sends the location information of the target UE to the requester, and step 307 and step 310 will be omitted; otherwise, the V-GMLC obtains the address information of the GMLC that can directly access the requester according to the address information of the requester, and sends to the GMLC the MO-LR locating information notification with the location information of the target UE, the requester identifier and the target UE identifier and notifies the GMLC that the target UE demands to provide the specified requester with the location information.

Step 308: after receiving the MO-LR locating information notification, the GMLC determines whether the GMLC can directly access the requester according to the requester identifier carried in the MO-LR locating information notification; if the GMLC can directly access the requester, the GMLC sends to the requester the target UE location information message with the location information of the target UE, and optionally further generates charging information; otherwise, the GMLC directly returns to the V-GMLC an MO-LR locating information notification response with a error reason.

While figuring out that it cannot directly access the specified requester, the GMLC can also find another GMLC which can directly access the requester according to the address information of the requester and then sends the target UE location information message to the requester through the found GMLC before continuing to execute step 309.

Step 309~step 311: after receiving the location information of the target UE, the requester determines whether it is able to process the received location information of the target UE, if the requester is able to process the received location information of the target UE, the requester will return a target UE location information response with a success mark to the GMLC; otherwise, the requester will return a target UE location information response with the error reason to the GMLC. After receiving the target UE location information response, the GMLC returns to the CN a target UE location report response with the corresponding content according to the content carried in the target UE location information response. In other words, if the target UE location information response received by the GMLC carries a success mark, the GMLC will return to the CN the target UE location report response with a success mark; if the target UE location information response received by the GMLC carries the error reason, the GMLC will return to the CN the target UE location report response with the error reason.

If the CN provides the location information of the target UE to the GMLC through the V-GMLC, the GMLC will firstly return to the V-GMLC the MO-LR locating information notification response with the corresponding content. In other words, if the GMLC receives the target UE location information response with a success mark, the GMLC will return to the V-GMLC the MO-LR locating information notification response with a success mark; if the GMLC receives the target UE location information response with the error reason, the GMLC will return to the V-GMLC the MO-LR locating information notification response with the error reason. Then the V-GMLC returns to the CN the target UE location report response with the corresponding content.

Step 312: after receiving the target UE location report response, the CN returns to the target UE an LCS MO-LR response with the corresponding content according to the content carried in the target UE location report response. In other words, if the target UE location report response received by the CN carries a success mark, the CN will return the LCS MO-LR response with a success mark to the target UE and notify the target UE that location information has been provided to the corresponding requester; if the target UE location report response received by the CN carries the error reason, the CN will return to the target UE the LCS MO-LR response with the location information of the target UE and the error reason, and notify the target UE that the location information has been provided to the corresponding requester, but the requester cannot process the location information.

In accordance with the aforesaid process, the CN sends a defined target UE location report to the V-GMLC to notify the V-GMLC that the target UE has initiated the MO-LR Location Services Invoke; in practical application, the message for notifying the V-GMLC that the target UE has initiated the MO-LR Location Services Invoke can be redefined, such as a MO-LR Location Services Invoke locating information, so that the message returned to the CN by the V-GMLC can be the MO-LR Location Services Invoke locating information response accordingly.

Figure 4:
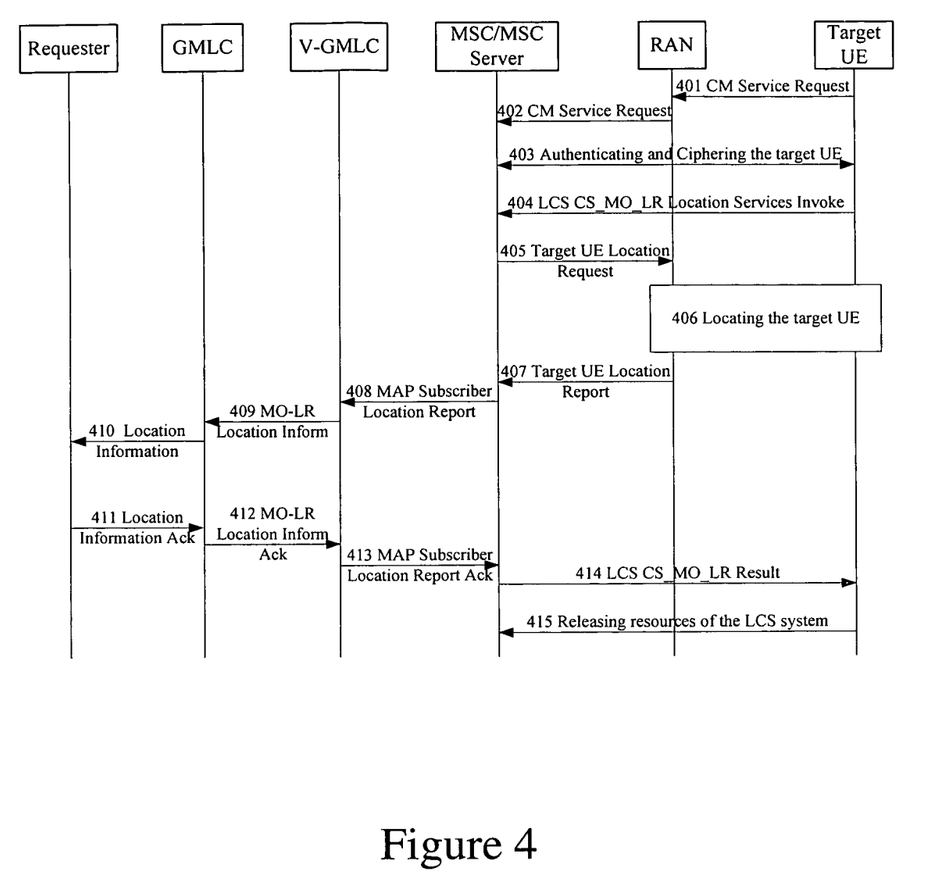
FIG. 4 is a flowchart illustrating the process in accordance with a first embodiment in the present invention.

FIG. 4 is a flowchart illustrating the process in accordance with the first embodiment in the present invention, with reference to FIG. 4, in the embodiment, process of a Circuit Switching (CS) MO-LR Location Services Invoke, which carries an identifier of an external requester and address information of the GMCL that can directly access the requester, includes the following steps:

Step 401~step 403: the target UE sends a Call Management (CM) Service Request to the RAN and requests to establish a wireless signaling connection with the network. After receiving the CM Service Request, the RAN forwards the CM Service Request to a Mobile Switch Center (MSC)/Mobile Switch Center Server (MSC Server). After receiving the CM Service Request, the MSC/MSC Server interacts with the target UE to authenticate and cipher the target UE, if the target UE passes the authentication, the MSC/MSC Server notifies the target UE that the CM Service Request initiated by the target UE has been accepted and continues to execute step 404; otherwise, the MSC/MSC Server notifies the target UE that the CM Service Request initiated by the target UE has been rejected.

Step 404~step 406: after passing the authentication by the MSC/MSC Server, the target UE sends an LCS CS_MO_LR Location Services Invoke to the MSC/MSC Server and requests the network with the LCS system to locate the target UE, the LCS CS_MO_LR Location Services Invoke carries the identifier of the external requester and the address information of the GMLC that can directly access the requester, so that the MSC/MSC Server can provide the corresponding external requester with the location information of the target UE. After receiving the LCS CS_MO_LR Location Services Invoke, the MSC/MSC Server determines whether the target UE has subscribed to the MO-LR service according to the stored information. If the target UE has not subscribed to the MO-LR service, the MSC/MSC Server will return an LCS CS_MO_LR Result that carries the error reason to the target UE and reject the MO-LR Location Services Invoke initiated by target UE, if the target UE has subscribed to the MO-LR service, the MSC/MSC Server will send a Location Request to the RAN; the RAN will locate the target UE after receiving the Location Request.

Step 407: after finishing locating the target UE and obtaining the location information of the target UE successfully, the RAN returns a Location Report that carries the location estimate of the target UE to the MSC/MSC Server.

Step 408: after receiving the Location Report, the MSC/MSC Server determines whether the MSC/MSC Server can directly access the GMLC according to the GMLC address information carried in the LCS CS_MO_LR Location Services Invoke. If the MSC/MSC Server can directly access the GMLC, the MSC/MSC Server directly sends an MAP Subscriber Location Report that carries the location information of the target UE, the requester identifier and the target UE identifier to the GMLC, and then step 410 is executed without executing step 409 or step 412. If the MSC/MSC Server cannot directly access the GMLC, the MSC/MSC Server can obtain the address information of a V-GMLC that the MSC/MSC Server can directly access according to the stored information or by interacting with other entities in the network, and then send the MAP Subscriber Location Report, which carries the location information of the target UE, the requester identifier and the target UE identifier, to the V-GMLC to notify the V-GMLC that the target UE has initiated the MO-LR Location Services Invoke, and then step 409 is executed.

Step 409: after receiving the MAP Subscriber Location Report, the V-GMLC generates a corresponding call detail record according to the related information carried in the MAP Subscriber Location Report, and then sends an MO-LR Location Inform, which carries the location information of the target UE, the requester identifier and the target UE identifier, to the GMLC according to the address information of the GMLC carried in the MAP Subscriber Location Report.

Step 410~step 412: after receiving the MO-LR Location Inform, the GMLC sends a Location Information that carries the location information of the target UE to the requester according to the requester identifier. After receiving the Location Information, the requester determines whether it can process the location information of the target UE. If the requester can process the location information of the target UE, the requester will return a Location Information Ack that carries a success mark to the GMLC; otherwise, the requester will return a Location Information Ack that carries a failure mark or/and the error reason to the GMLC. After receiving the Location Information Ack, the GMLC returns an MO-LR Location Inform Ack to the V-GMLC.

Step 413~step 414: after receiving the MO-LR Location Inform Ack, according to the content carried in the MO-LR Location Inform Ack, i.e. whether the requester can process the location information of the target UE successfully as well as the location information of the target UE, the V-GMLC generates the corresponding call detail record and then returns a corresponding MAP Subscriber Location Report Ack to the MSC/MSC server. After receiving the MAP Subscriber Location Report Ack, the MSC/MSC server sends the LCS CS_MO_LR Result, which carries the processing result upon the location information of the target UE processed by the requester to the target UE.

Step 415: the occupied resources in the LCS system are released and the current LCS CS MO-LR Location Services Invoke process is terminated.

Figure 5:
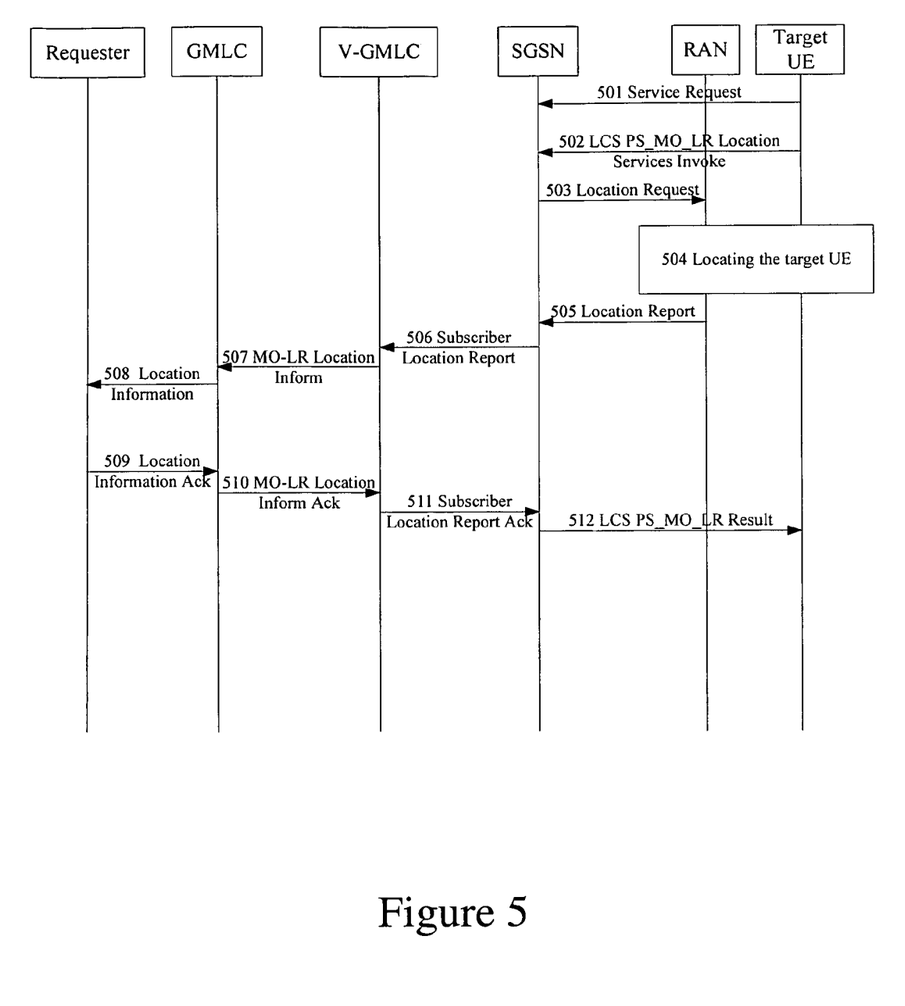
FIG. 5 is a flowchart illustrating the process in accordance with a second embodiment in the present invention.

FIG. 5 is a flowchart illustrating the process in accordance with the second embodiment in the present invention, with reference to FIG. 5, in the embodiment, the process of a Packet Switching (PS) MO-LR Location Services Invoke, which carries an identifier of an external requester but does not carry address information of the GMCL that can directly access the requester, includes the following steps:

Step 501: the target UE sends a Service Request to a Serving GPRS Support Node (SGSN) and requests to establish a wireless signaling connection with the network. After receiving the Service Request, the SGSN establishes a PS signaling connection to the target UE.

Step 502~step 504: the target UE sends an LCS PS_MO_LR Location Services Invoke to the SGSN and requests the network with the LCS system to locate the target UE; the LCS PS_MO_LR Location Services Invoke carries the identifier of the external requester, so that the SGSN can provide the location information of the target UE to the corresponding external requester. After receiving the LCS PS_MO_LR Location Services Invoke, the SGSN can determine whether the target UE has subscribed to the MO-LR service according to the stored information. If the target UE has not subscribed to the MO-LR service, the SGSN will return an LCS PS_MO_LR Result that carries the error reason to the target UE and reject the MO-LR Location Services Invoke initiated by the target UE. If the target UE has subscribed to the MO-LR service, the SGSN will send a Location Request to the RAN; the RAN will locate the target UE after receiving the Location Request.

Step 505~step 506: after finishing locating the target UE and obtaining location information of the target UE successfully, the RAN returns a Location Report that carries the location estimate of the target UE to the SGSN. After receiving the Location Report, the SGSN finds out that the target UE demands to provide the external requester with the location information; since the LCS PS_MO_LR Location Services Invoke does not carry the address information of the GMLC that can directly access the requester, the SGSN can obtain the address information of a V-GMLC that the SGSN can directly access according to the stored information or by interacting with other entities in the network, and then send a Subscriber Location Report, which carries location information of the target UE, the requester identifier and the target UE identifier, to the V-GMLC to notify the V-GMLC that the target UE has initiated the MO-LR Location Services Invoke.

Step 507: after receiving the Subscriber Location Report, the V-GMLC generates a corresponding call detail record according to related information carried in the Subscriber Location Report, and then obtains the address information of the requester according to the requester identifier carried in the Subscriber Location Report; the V-GMLC determines whether it can directly access the requester. If the V-GMLC can directly access the requester, the V-GMLC directly sends a Location Information to the requester without executing step 507 and step 510; otherwise, the V-GMLC will find the address information of a GMLC that can directly access the requester according to the address information of the requester, and send an MO-LR Location Inform, which carries the location information of the target UE, the requester identifier and the target UE identifier, to the GMLC and notify the GMLC that the target UE demands to provide the specified requester with the location information.

Step 508: after receiving the MO-LR Location Inform, the GMLC determines whether the GMLC can directly access the requester according to the requester identifier carried in the MO-LR Location Inform. If the GMLC can directly access the requester, the GMLC will send the Location Information that carries the location information of the target UE to the requester; otherwise, the GMLC will directly return an MO-LR Location Inform Ack that carries a error reason to the V-GMLC.

Step 509: after receiving the location information of the target UE, the requester determines whether the requester can process the location information of the target UE. If the requester can process the location information of the target UE, the requester will return a Location Information Ack that carries a success mark; otherwise, the requester will return a Location Information Ack that carries the error reason.

Step 510: after receiving the Location Information Ack, GMLC returns the MO-LR Location Information Ack that carries the corresponding content to the V-GMLC according to the content carried in the Location Information Ack. In other words, if the Location Information Ack received by the GMLC carries a success mark, the GMLC will return an MO-LR Location Information Ack that carries a success mark to the V-GMLC; if the Location Information Ack received by GMLC carries the error reason, the GMLC will return an MO-LR Location Information Ack that carries the error reason to the V-GMLC.

Step 511~step 512: after receiving the MO-LR Location Information Ack, the V-GMLC returns a Subscriber Location Report Ack that carries the corresponding content to the SGSN. After receiving the Subscriber Location Report Ack, the SGSN returns the LCS PS-MO-LR Result that carries the corresponding content to the target UE according to the content carried in the message. In other words, if the Subscriber Location Report Ack received by the SGSN carries a success mark, the SGSN will return the LCS PS-MO-LR Result that carries a success mark to the target UE and notifies the target UE that the location information of the target UE has been provided to the corresponding requester; if the Subscriber Location Report Ack received by the SGSN carries the error reason, the SGSN will return to the target UE the LCS PS-MO-LR Result that carries the location information, as well as the error reason and notify the target UE that location information of the target UE has been provided to the corresponding requester, but the requester cannot correctly process the location information.

In the process shown in FIG. 3, the V-GMLC can also send the target UE location report to the GMLC through the H-GMLC, and then the GMLC sends the report to the requester. In other words, another processing manner in accordance with the embodiments of the present invention is: the target UE requests the network with the LCS system for the location information of itself; the CN allocates a V-GMLC that the CN can directly access after obtaining the location estimate of the target UE provided by the RAN and provides the location estimate of the target UE to the V-GMLC; the V-GMLC determines whether the target UE demands that the V-GMLC provide the location information of the target UE to the requester; if the target UE does, the V-GMLC will provide the location estimate of the target UE to the H-GMLC. Herein, the V-GMLC can obtain the address information of the H-GMLC by inquiring the Home Location Register/

Home Subscriber Server (HLR/HSS). If the target UE specifies the address of the GMLC accessing the requester in the Location Request sent to the LCS system for locating the target UE, the H-GMLC will directly send the location estimate of the target UE to the GMLC, and the GMLC will provide the location estimate of the target UE to the specified requester; otherwise, the H-GMLC will determine whether the H-GMLC itself is able to access the requester directly according to requester identifier in the MO-LR Location Services Invoke location information message, and if the H-GMLC is, the H-GMLC will directly provide the location information of the target UE to the requester. Otherwise, the H-GMLC will find a GMLC that can directly access the requester and send the location information of the target UE to the requester through the GMLC. If the V-GMLC determines that the target UE does not demand to provide the location information of itself to the requester, the V-GMLC will return an MO-LR Location Services Invoke positioning information response to the CN after finishing processing the location information of the target UE, e.g. generating corresponding charging information, and the CN will return an LCS MO-LR Location Services Invoke response to the target UE and terminate processing the MO-LR Location Services Invoke initiated by the target UE.

Figure 6:
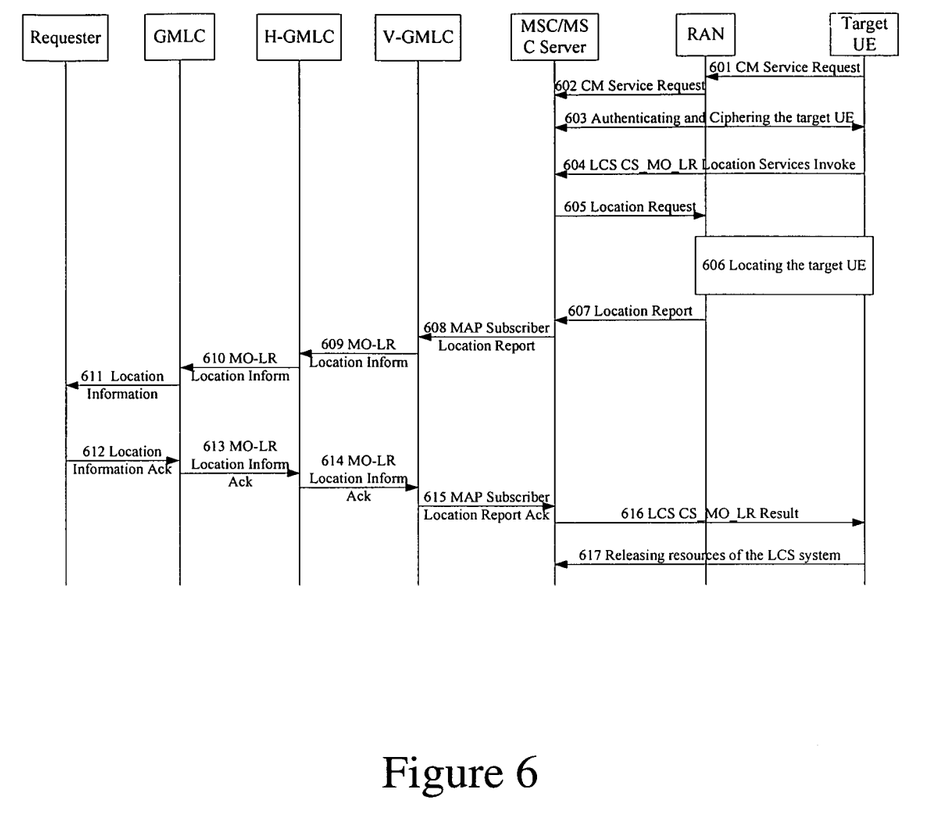
FIG. 6 is a flowchart illustrating the process in accordance with a third embodiment in the present invention.

FIG. 6 is a flowchart illustrating the process in accordance with the third embodiment in the present invention, as shown in FIG. 6, in the embodiment, the process of an LCS CS MO-LR Location Services Invoke, which carries an identifier of an external requester and address information of the GMCL that can directly access the requester, includes the following steps:

Step 601~step 603: the target UE sends a CM Service Request to the RAN and requests to establish a wireless signaling connection with the network. After receiving the CM Service Request, the RAN forwards the CM Service Request to the MSC/MSC Server. After receiving the CM Service Request, the MSC/MSC Server interacts with the target UE to authenticate and cipher the target UE. If the target UE passes the authentication, the MSC/MSC Server notifies the target UE that the CM Service Request initiated by the target UE has been accepted and continues to execute step 604; otherwise, the MSC/MSC Server notifies the target UE that the CM Service Request initiated by the target UE has been rejected.

Step 604~step 606: after passing the authentication by the MSC/MSC Server, the target UE sends an LCS CS_MO_LR Location Services Invoke to the MSC/MSC Server and requests the network with the LCS system to locate the target UE; moreover, the LCS CS_MO_LR Location Services Invoke carries the identifier of the external requester and the address information of the GMLC that can access the external requester, so that the MSC/MSC Server can provide the location information of the target UE to the corresponding external requester through the GMLC. After receiving the LCS CS_MO_LR Location Services Invoke, MSC/MSC Server determines whether the target UE has subscribed to the MO-LR service according to the stored information; if the target UE has not subscribed to the MO-LR service, the MSC/MSC Server will return an LCS CS_MO_LR Result that carries the error reason to the target UE and reject the MO-LR Location Services Invoke initiated by target UE; if the target UE has subscribed to the MO-LR service, the MSC/MSC Server will send a Location Request to the RAN; the RAN will locate the target UE after receiving the Location Request.

Step 607: after finishing locating the target UE, the RAN returns a Location Report that carries the location estimate of the target UE to the MSC/MSC Server. After receiving the Location Report, the MSC/MSC Server determines whether the RAN has obtained the location information of the target UE successfully, if the RAN has succeeded in locating the target UE, i.e. the RAN has obtained the location information of the target UE successfully or the Location Report received by the MSC/MSC Server carries the location information of the target UE, the MSC/MSC Server will obtain the address information of a V-GMLC that the MSC/MSC Server can directly access according to the stored information or by interacting with other entities in the network, and then step 608 and step 609 will be executed; if the RAN fails in locating the target UE, the MSC/MSC Server will directly return the LCS_CS_MO-LR Result to the target UE and notify the target UE of the unsuccessful location without executing step 608~step 615.

Step 608~step 609: the MSC/MSC Server sends to the V-GMLC an MAP Subscriber Location Report that carries 1 the location estimate of the target UE and the address information of the H-GMLC, moreover, the MAP Subscriber Location Report also carries the type of the MO-LR Location Services Invoke initiated by the target UE. After receiving the MAP Subscriber Location Report, the V-GMLC finds out according to identifier of external requester that the target UE demands to provide the external requester with the location information of the target UE, the V-GMLC will send an MO-LR Location Inform to the H-GMLC to notify the H-GMLC that the target UE has initiated the MO-LR Location Services Invoke. Herein, the V-GMLC can obtain the address information of the H-GMLC by interacting with other entities in the network such as the Home Subscriber Server (HSS).

Step 610: after receiving the MO-LR Location Inform, the H-GMLC authenticates the target UE at first, such as checking if the target UE has subscribed to the requested MO-LR service or whether the account balance of the target UE is sufficient and so on; after the target UE passes the authentication, the H-GMLC will store relevant information of the MO-LR Location Services Invoke initiated by the target UE and generates a corresponding call detail record. If the MO-LR Location Inform received by the H-GMLC carries the address of the GMLC that can directly access the external requester specified in the MO-LR Location Services Invoke initiated by the target UE, the H-GMLC will directly send the MO-LR Location Inform, which carries the location information of the target UE, the requester identifier and the target UE identifier, to the GMLC and notify the GMLC that the target UE demands to provide the specified requester with location information of the target UE. Otherwise, the H-GMLC determines whether the H-GMLC itself is able to directly access the requester, if the H-GMLC is, the H-GMLC will directly send a Location Information to the requester without executing step 610 and step 613; otherwise, the H-GMLC will find the address information of a GMLC that can directly access the requester according to the address information of the requester, and send the MO-LR Location Inform, which carries the location information of the target UE, the requester identifier and the target UE identifier, to the GMLC and notify the GMLC that the target UE demands to provide the specified requester with the location information of the target UE.

Step 611: after receiving the MO-LR Location Inform, GMLC determines whether GMLC is able to directly access the requester according to the requester identifier carried in the MO-LR Location Inform, if the GMLC is, the GMLC will send the Location Information that carries the location information of the target UE to the requester; otherwise, the GMLC will directly return an MO-LR Location Inform Ack that carries the error reason to the V-GMLC.

Step 612: after receiving the location information of the target UE, the requester determines whether it can process the location information of the target UE, if the requester can process the location information of the target UE, the requester will return a Location Information Ack that carries a success mark to the GMLC; otherwise, the requester will return a Location Information Ack that carries the error reason to the GMLC.

Step 613: After receiving Location Information Ack, the GMLC returns the MO-LR Location Inform Ack that carries the corresponding content to the H-GMLC according to the content carried in the Location Information Ack. In other words, if the Location Information Ack received by the GMLC carries a success mark, the GMLC will return an MO-LR Location Inform Ack that carries a success mark to the H-GMLC; if the Location Information Ack received by the GMLC carries the error reason, the GMLC will return an MO-LR Location Inform Ack that carries the error reason to the H-GMLC.

Step 614: after receiving the MO-LR Location Inform Ack, according to the content carried in the MO-LR Location Inform Ack, e.g. whether the requester can process the location information of the target UE successfully, as well as the location information of the target UE, the H-GMLC generates the corresponding call detail record and then returns an MO-LR Location Inform Ack that carries the corresponding content to the V-GMLC according to the contents carried in MO-LR Location Inform Ack. In other words, if the MO-LR Location Inform Ack received by the H-GMLC carries a success mark, the H-GMLC will return the MO-LR Location Inform Ack that carries a success mark to the V-GMLC; if the Location Information Ack received by the GMLC carries the error reason, the H-GMLC will return the MO-LR Location Inform Ack that carries the error reason to the V-GMLC.

Step 615~step 616: after receiving the MO-LR Location Inform Ack, the V-GMLC returns a corresponding MAP Subscriber Location Report Ack to the MSC/MSC server. After receiving the MAP Subscriber Location Report Ack, the MSC/MSC server sends the LCS CS_MO_LR Result, which carries the processing result upon the location information of the target UE provided by the requester, to the target UE.

Step 617: the occupied resources of LCS system are released and the current LCS CS MO-LR Location Services Invoke process is terminated.

Figure 7:
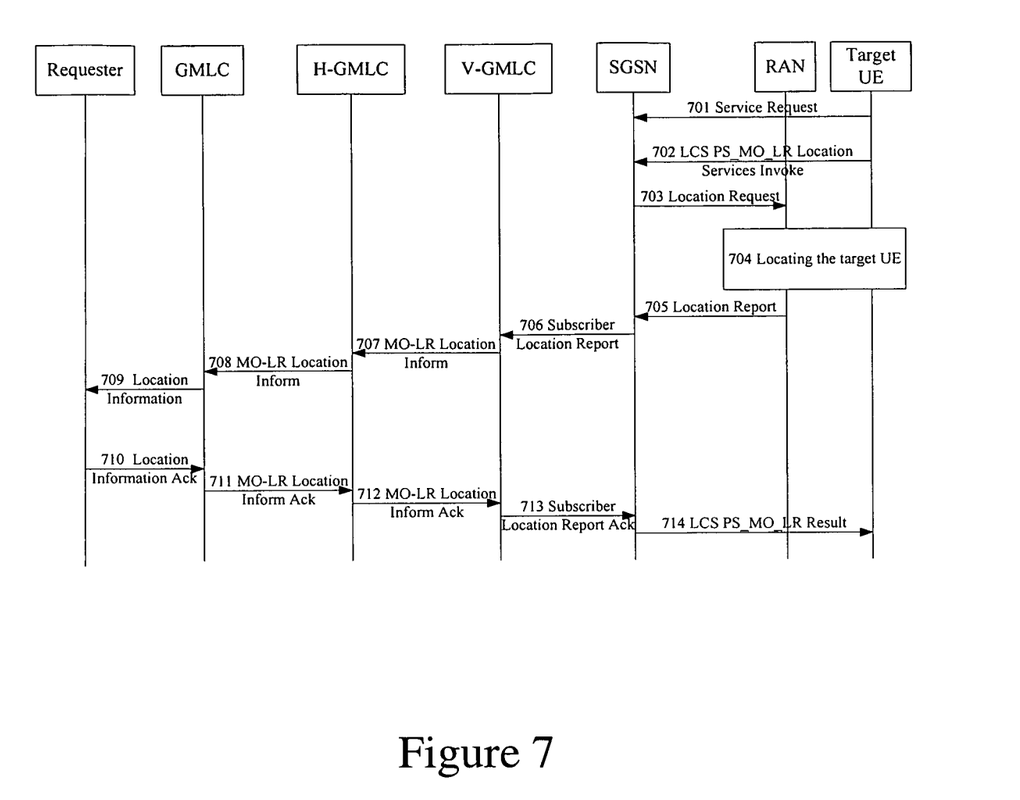
FIG. 7 is a flowchart illustrating the process in accordance with a fourth embodiment in the present invention.

FIG. 7 is a flowchart illustrating the process in accordance with the fourth embodiment in the present invention, with reference to FIG. 7, in the embodiment, the process of an LCS PS MO-LR Location Services Invoke, which carries an identifier of an external requester but does not carry address information of the GMCL that can directly access the requester, includes the following steps:

Step 701: the target UE sends a Service Request to a Serving GPRS Support Node (SGSN) and requests to establish a wireless connection with the network. After receiving the Service Request, the SGSN establishes a PS signaling connection to the target UE.

Step 702~step 704: the target UE sends an LCS PS_MO_LR Location Services Invoke to the SGSN and requests the network with LCS system to locate the target UE; the LCS PS_MO_LR Location Services Invoke carries address information of the H-GMLC and the identifier of the external requester, so that the SGSN can provide the corresponding external requester with the location information of the target UE. After receiving the LCS PS_MO_LR Location Services Invoke, the SGSN stores the address information of the H-GMLC and then sends a Location Request to the RAN; after receiving the Location Request, the RAN will locate the target UE.

Step 705: after finishing locating the target UE, the RAN returns a Location Report that carries the location estimate of the target UE to the SGSN. After receiving the Location Report, the SGSN determines whether the RAN has obtained the location information of the target UE successfully, if the RAN has succeeded in locating the target UE, i.e. the RAN has obtained the location information of the target UE successfully so that the Location Report received by the SGSN carries the location information of the target UE, the SGSN will obtain the address information of the V-GMLC that the SGSN can directly access according to the stored information or by interacting with other entities in the network, and step 706~step 714 will be executed subsequently; if the RAN fails in locating the target UE, the SGSN will directly return an LCS_PS_MO-LR Result to the target UE and notify the target UE of the unsuccessful location, without executing step 706~step 713.

Step 706~step 707: the SGSN returns to the V-GMLC a Subscriber Location Report that carries the location estimate of the target UE, the requester identifier and the address information of the H-GMLC, moreover, the Subscriber Location Report also carries the type of the MO-LR Location Services Invoke initiated by the target UE. After receiving the Subscriber Location Report, the V-GMLC finds out that the target UE demands to provide the external requester with the location information of the target UE according to identifier of the external requester carried in the Subscriber Location Report, and sends an MO-LR Location Inform to the H-GMLC to notify the H-GMLC that the target UE has initiated the MO-LR Location Services Invoke and has requested the LCS system to provide the external requester with the obtained location information of the target UE. Herein, the V-GMLC can obtain the address information of the H-GMLC by interacting with other entities in the network such as a Home Subscriber Server (HSS). After receiving the MO-LR Location Inform, the H-GMLC authenticates the target UE at first, e.g. checks if the target UE has subscribed to the requested MO-LR service or whether the account balance of the target UE is sufficient and so on; after the target UE passes the authentication, the H-GMLC will obtain the address information of the requester according to the requester identifier, and determine whether the H-GMLC is able to directly provide the requester with the location information of the target UE. If the H-GMLC is, the H-GMLC directly sends the Location Information that carries the location information of the target UE to the requester without executing step 708 and step 711; otherwise, the H-GMLC finds a GMLC that can directly access the requester before step 708 is executed.

Step 708~step 709: the H-GMLC sends an MO-LR Location Inform that carries the location information of the target UE and the requester identifier to the found GMLC. After receiving the MO-LR Location Inform, the GMLC sends to the requester a Location Information that carries the location information of target UE according to the requester identifier.

Step 710~step 711: after receiving the location information of the target UE, the requester determines whether it can process the location information of the target UE. If the requester can process the location information of the target UE, the requester will return a Location Information Ack that carries a success mark to the GMLC; otherwise, the requester will return a Location Information Ack that carries a failure mark or/and the error reason to the GMLC. After receiving the Location Information Ack, the GMLC returns an MO-LR Location Inform Ack to the H-GMLC.

Step 712~step 714: after receiving the MO-LR Location Inform Ack, according to the content carried in the MO-LR Location Inform Ack, i.e. whether the requester can process the location information of the target UE successfully, as well as the location information of the target UE, the H-GMLC generates a corresponding call detail record and then returns the MO-LR Location Inform Ack that carries the corresponding content to the V-GMLC. After receiving the MO-LR Location Inform Ack, the V-GMLC returns a Subscriber Location Report Ack to the SGSN. After receiving the Subscriber Location Report Ack, the SGSN sends an LCS CS_MO_LR Result, which carries the processing result upon 1 the location information of the target UE provided by requester, to the target UE.

If the target UE does not demand that network with the LCS system provide an external requester with the location information of the target UE, the aforesaid process will not include the subsequent process of providing the requester with the location information of the target UE.

To sum up, the above description is just a preferable embodiment of the present invention and is not to be used to limit the protection scope of the present invention.

The invention claimed is:

1. A method for processing location information request initiated by a User Equipment (UE), comprising:
   receiving, by a Central Network (CN), a request for location information from a target UE, and the CN obtaining a location estimate of the target UE;
   sending, by the CN, the location estimate of the target UE to a Gateway Mobile Location Center (GMLC) of the target UE;
   receiving, by the CN, a requester identifier from the target UE;
   providing, by the CN, the GMLC with the requester identifier so that the GMLC sends the location estimate of the target UE to the requester;
   wherein the GMLC sends the location estimate of the target UE to the requester comprises:
   the GMLC determining whether the GMLC can directly access the requester according to the requester identifier,
   if the GMLC can directly access the requester according to the requester identifier, the GMLC directly sending the location estimate of the target UE to the requester; and
   receiving, by the CN, a second response for the location estimate of the target UE from the GMLC after the requester returns a first response for the location estimate of the target UE to the GMLC;
   if the GMLC cannot directly access the requester according to the requester identifier, according to the requester identifier, the GMLC determining a second GMLC that can directly access the requester, and sending the location estimate of the target UE to the requester through the second GMLC; receiving, by the second GMLC, a first response for the location estimate of the target UE from the requester; returning, by the second GMLC, a second response for the location estimate of the target UE to the GMLC, and returning, by the GMLC, a third response for the location estimate of the target UE to the CN; and
   sending, by the CN, the location estimate of the target UE to the target UE.

2. The method according to claim 1, further comprising:
   according to a pre-stored GMLC address information, the CN sending the location estimate of the target UE to the GMLC.

3. The method according to claim 1, wherein, after the CN sending the location estimate of the target UE to the GMLC of the target UE, the method further comprises:
   the GMLC generating charging information of the target UE.

4. The method according to claim 1, wherein, after the CN sending the location estimate of the target UE to the GMLC of the target UE, the method further comprises:
   receiving, by the CN, a response for the location estimate of the target UE from the GMLC.

5. The method according to claim 1, wherein, the receiving, by the CN, the requester identifier from the target UE further comprises:
   receiving, by the CN, address information of the second GMLC that can access the requester from the target UE;
   the CN sending the location estimate of the target UE to the GMLC of the target UE further comprises:
   the CN providing the address information of the second GMLC to the V-GMLC; and
   the GMLC sending the location estimate of the target UE to the requester comprises:
   the GMLC receiving the location estimate of the target UE and sending the location estimate of the target UE as well as the requester identifier to the second GMLC according to the address information of the second GMLC;
   the second GMLC receiving the location estimate of the target UE and sending the location estimate of the target UE to the requester according to the requester identifier.

6. The method according to claim 5, wherein, after the second GMLC receiving the location estimate of the target UE and sending the location estimate of target UE to the requester according to the requester identifier, further comprising:
   receiving, by the second GMLC, a first response for the location estimate of the target UE from the requester,
   returning, by the second GMLC, a second response for the location estimate of the target UE to the GMLC, and
   returning, by the GMLC, a third response for the location estimate of the target UE to the CN.

7. The method according to claim 1, wherein, the CN is any one of: a Mobile Switch Center (MSC), an MSC Server and a Serving GPRS Support Node.

8. The method according to claim 1, wherein, the receiving, by the CN, the request for location information from the target UE comprises:
   receiving, by the CN, an LCS MO-LR Location Services Invoke from the target UE.

9. A method for processing location information request initiated by a User Equipment (UE), comprising:
   a Center Network (CN) receiving a request for location information and a requester identifier from a target UE;
   the CN obtaining the location estimate of the target UE;
   the CN sending the location estimate of the target UE to a Visited Gateway Mobile Location Center (V-GMLC) of the target UE;
   the V-GMLC sending the location estimate of the target UE to a home GMLC (H-GMLC); and
   the H-GMLC determining whether the H-GMLC can directly access the requester according to the requester identifier;
   if the H-GMLC can directly access the requester according to the requester identifier, the H-GMLC directly sending the location estimate of the target UE to the requester;
   receiving, by the H-GMLC, a first response for the location estimate of the target UE from the requester; returning, by the H-GMLC, a second response for the location estimate of the target UE to the V-GMLC; and returning, by the V-GMLC, a third response for the location estimate of target UE to the CN;

if the H-GMLC cannot directly access the requester according to the requester identifier, according to the requester identifier, the H-GMLC finding a GMLC that can directly access the requester and sending the location estimate of the target UE to the requester through the GMLC; receiving, by the GMLC, a response for the location estimate of the target UE from the requester; returning, by the GMLC, a response for the location estimate of the target UE to the H-GMLC; returning, by the H-GMLC, a response for the location estimate of the target UE to the V-GMLC; and returning, by the V-GMLC, a response for the location estimate of target UE to the CN; and the V-GMLC sending the location estimate of the target UE to the target UE via the CN.

10. The method according to claim 9, wherein, after of the CN sending the location estimate of the target UE to a V-GMLC of the target UE, the method further comprises:
the V-GMLC generating charging information of the target UE.

11. The method according to claim 9, wherein, after the V-GMLC sending the location estimate of the target UE to a H-GMLC, the method further comprises;
the H-GMLC generating charging information of the target UE.

12. The method according to claim 9, wherein, after the H-GMLC sending the location estimate of the target UE to the requester, the method further comprises:
receiving, by the H-GMLC, a response for the location estimate of the target UE from the requester,
returning, by the H-GMLC, a response for the location estimate of the target UE to the V-GMLC, and
returning, by the V-GMLC, a response for the location estimate of the target UE to the CN.

13. The method according to claim 9, wherein, the CN receiving the request for location information and the requester identifier from the target UE further comprises:
receiving, by the CN, address information of the GMLC that can access the requester from the target UE;
the CN sending the location estimate of the target UE to the V-GMLC of the target UE further comprises:
the CN providing the address information of the GMLC to the V-GMLC;
the V-GMLC sending the location estimate of the target UE to the H-GMLC further comprises:
the V-GMLC providing the address information of the GMLC to the H-GMLC; and
the H-GMLC sending the location estimate of the target UE to the requester comprises:
the H-GMLC receiving the location estimate of the target UE and sending the location estimate of the target UE as well as the requester identifier to the GMLC according to the address information of the GMLC;
the GMLC receiving the location estimate of the target UE and sending the location estimate of the target UE to the requester according to the requester identifier.

14. The method according to claim 13, wherein, after the GMLC receiving the location estimate of the target UE and sending the location estimate of the target UE to the requester according to the requester identifier, the method further comprises:
receiving, by the GMLC, a first response for the location estimate of the target UE from the requester,
returning, by the GMLC, a second response for the location estimate of the target UE to the H-GMLC,
returning, by the H-GMLC, a third response for the location estimate of the target UE to the V-GMLC; and
returning, by the V-GMLC, a fourth response for the location estimate of target UE to the CN.

15. The method according to claim 9, wherein, the CN is any one of: a Mobile Switch Center (MSC), an MSC Server and a SGSN.

16. The method according to claim 9, wherein, the CN receiving the request for location information from the target UE comprises:
the CN receiving an LCS MO-LR Location Services Invoke to from the target UE.

17. The method according to claim 1, further comprising:
sending, by the GMLC, the location estimate of the target UE to the second GMLC that can directly access a specified requester; and
providing, by the second GMLC, the specified requester with the location estimate of the target UE.

18. The method according to claim 1, wherein the location estimate of the target UE carries location information of the target UE, a requester identifier, a target UE identifier and the second GMLC address information.

19. A method for processing location information request initiated by a user equipment (UE), comprising:
receiving, by a visited gateway mobile location center (V-GMLC) of a target UE, a location estimate of the target UE from a central network (CN) after the CN receives a request for location information from the target UE, and obtains the location estimate of the target UE;
wherein a requester identifier is sent from the target UE to the CN, the method further comprising:
receiving, the V-GMLC, the requester identifier from the CN;
determining, by the V-GMLC, whether the V-GMLC can directly access the requester according to the requester identifier; and
if the V-GMLC can directly access the requester according to the requester identifier, the V-GMLC directly sending the location estimate of the target UE to the requester;
if the V-GMLC cannot directly access the requester according to the requester identifier, according to the requester identifier, the V-GMLC determining a GMLC that can directly access the requester, and sending the location estimate of the target UE to the requester through the GMLC; and
sending, by the V-GMLC, the location estimate of the target UE to the target UE via the CN.

20. The method according to claim 19, wherein, after the V-GMLC directly sending the location estimate of the target UE to the requester, the method further comprises:
receiving, by the V-GMLC, a first response for the location estimate of the target UE from the requester, and
returning, by the V-GMLC, a second response for the location estimate of the target UE to the CN; and
after the V-GMLC finding the GMLC that can directly access the requester and sending the location estimate of the target UE to the requester through the GMLC, the method further comprises:
receiving, by the GMLC, a first response for the location estimate of the target UE from the requester,
returning, by the GMLC, a second response for the location estimate of the target UE to the V-GMLC, and
returning, by the V-GMLC, a third response for the location estimate of the target UE to the CN.

21. The method according to claim 19, wherein address information of the GMLC that can access the requester is sent from the target UE to the CN;
- the receiving, by the V-GMLC of the target UE, the location estimate of the target UE from the CN further comprises:
- receiving, by the V-GMLC, the address information of the GMLC from the CN; and
- the sending, by the V-GMLC, the location estimate of the target UE to the requester comprises:
- receiving, by the V-GMLC, the location estimate of the target UE; and
- sending, by the V-GMLC, the location estimate of the target UE as well as the requester identifier to the GMLC according to the address information of the GMLC so that the GMLC sends the location estimate of the target UE to the requester according to the requester identifier.

22. The method according to claim 21, further comprising:
- receiving, by the V-GMLC, a second response for the location estimate of the target UE from the GMLC after the requester returns a first response for the location estimate of the target UE to the GMLC, and
- returning, by the V-GMLC, a third response for the location estimate of the target UE to the CN.

23. A gateway mobile location center (GMLC) for processing location information request initiated by a user equipment (UE), comprising:
- a receiver, configured to receive a location estimate of the target UE from a central network (CN) after the CN receives a request for location information from the target UE and obtains the location estimate of the target UE; and
- a transmitter, configured to send the location estimate of the target UE to the target UE via the CN;
- wherein a requester identifier is sent from the target UE to the CN, the receiver is further configured to receive the requester identifier from the CN;
- the GMLC further comprises a processor, configured to determine whether the GMLC can directly access the requester according to the requester identifier; and
- if the GMLC can directly access the requester according to the requester identifier, the transmitter is further configured to directly send the location estimate of the target UE to the requester;
- if the GMLC cannot directly access the requester according to the requester identifier, the processor is further configured to determine a second GMLC that can directly access the requester according to the requester identifier, and the transmitter is further configured to send the location estimate of the target UE to the requester through the second GMLC.

24. The GMLC according to claim 23, wherein,
- after the transmitter directly sends the location estimate of the target UE to the requester, the receiver is further configured to receive a first response for the location estimate of the target UE to from the requester, and the transmitter is further configured to return a second response for the location estimate of the target UE to the CN; and
- after the processor determines the second GMLC that can directly access the requester, the transmitter sends the location estimate of the target UE to the requester through the second GMLC, and the second GMLC receives a first response for the location estimate of the target UE from the requester, the receiver is further configured to receive a second response for the location estimate of the target UE sent from the second GMLC, and the transmitter is further configured to return a third response for the location estimate of the target UE to the CN.

25. The GMLC according to claim 23, wherein address information of the second GMLC that can access the requester is sent from the target UE to the CN;
- the receiver is further configured to receive the address information of the second GMLC from the CN and receive the location estimate of the target UE; and
- the transmitter is further configured to send the location estimate of the target UE as well as the requester identifier to the second GMLC according to the address information of the second GMLC so that the second GMLC sends the location estimate of the target UE to the requester according to the requester identifier.

26. The GMLC according to claim 25, wherein
- the receiver is further configured to receive a second response for the location estimate of the target UE from the second GMLC after the requester returns a first response for the location estimate of the target UE to the second GMLC, and
- the transmitter is further configured to return a third response for the location estimate of the target UE to the CN.

* * * * *

UNITED STATES PATENT AND TRADEMARK OFFICE
CERTIFICATE OF CORRECTION

PATENT NO. : 8,718,677 B2
APPLICATION NO. : 10/585656
DATED : May 6, 2014
INVENTOR(S) : Xiaoqin Duan It is certified that error appears in the above-identified patent and that said Letters Patent is hereby corrected as shown below:

In the Claims

In Col. 20, line 14, claim 16, delete "to from the target" and insert --from the target--.
In Col. 22, line 10, claim 24, delete "to from the requester" and insert --from the requester--.

Signed and Sealed this
Thirtieth Day of September, 2014

Michelle K. Lee
*Deputy Director of the United States Patent and Trademark Office*